April 15, 1952  W. C. ANTHONY ET AL  2,593,240
GATE MOVING MEANS FOR VEHICLES
Filed June 16, 1949  4 Sheets-Sheet 1

Inventors
William C. Anthony
Lester W. Wachter
by Parker + Carter
Attorneys.

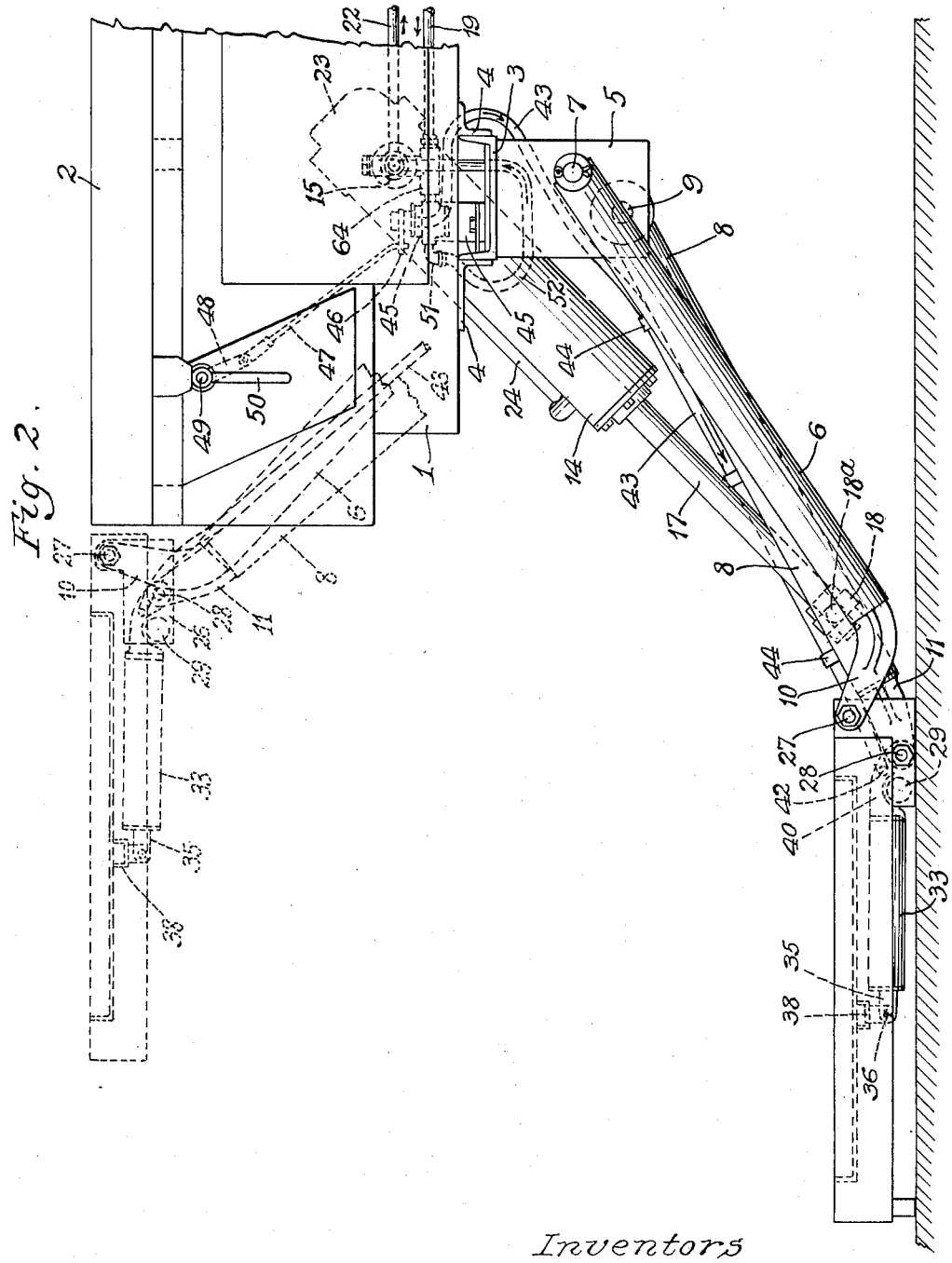

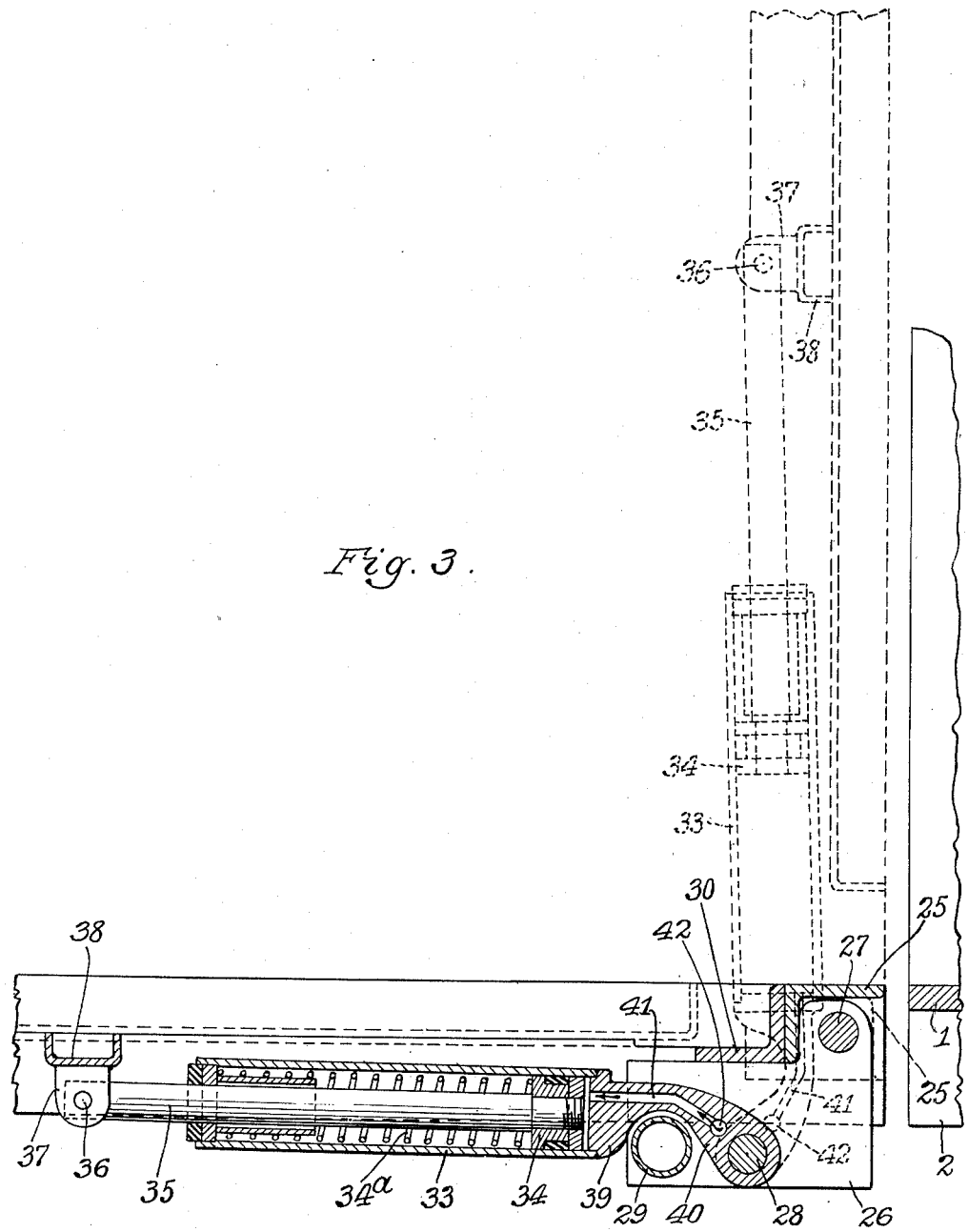

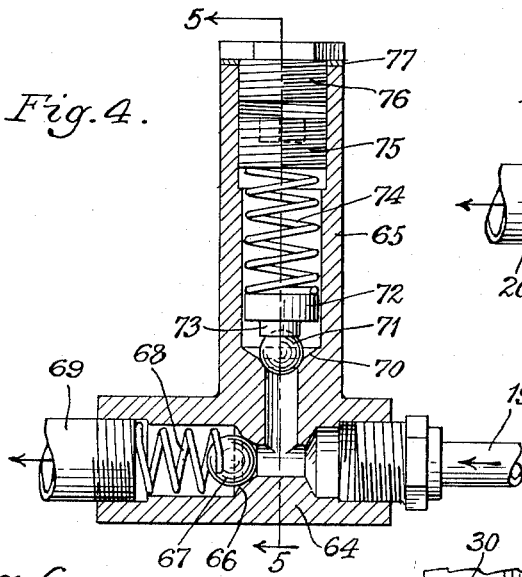
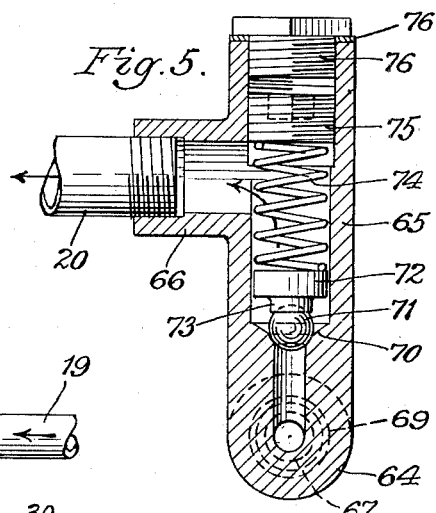
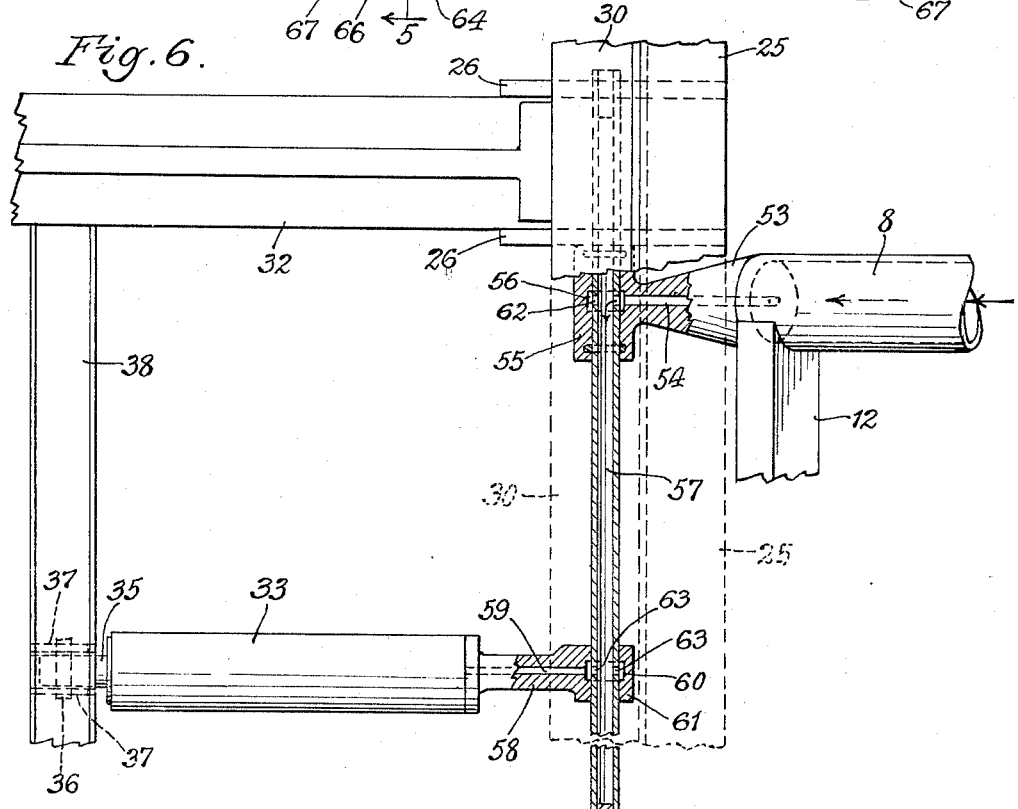

Patented Apr. 15, 1952

2,593,240

UNITED STATES PATENT OFFICE 2,593,240

GATE MOVING MEANS FOR VEHICLES

William C. Anthony and Lester W. Wachter, Streator, Ill., assignors to Anthony Company, Streator, Ill., a corporation of Illinois Application June 16, 1949, Serial No. 99,542

3 Claims. (Cl. 214—77)

This invention relates to a lifting assembly comprising a load carrying member which may also act as a gate. The invention has for one object to provide means for moving the surface member from the load carrying position to the vertical position in which it may act as a gate.

It has for another object to provide a hydraulic means for closing the gate member.

A further object is to provide means for closing the gate hydraulically and for utilizing the hydraulic system which also raises and lowers the gate member when it serves as a load carrying member.

A still further object is to provide a gate closing means arranged to move the gate to the closed position and to return it to the load carrying position.

Other objects will appear from time to time throughout the specification and claims.

The invention is illustrated more or less diagrammatically in the accompanying drawings, wherein:

Figure 2 is a side elevation of the device shown in Figure 1 on an enlarged scale;

Figure 3 is a vertical section taken at line 3—3 of Figure 1 illustrating the gate closing means on an enlarged scale;

Figure 4 is a sectional detail showing a valve assembly;

Figure 5 is a sectional detail taken at line 5—5 of Figure 4;

Figure 6 is a partial plan view with parts in section and with parts omitted showing a modified form of conduit means for the gate closing assembly.

Like parts are indicated by like characters throughout the specification and the drawings.

Figure 1:
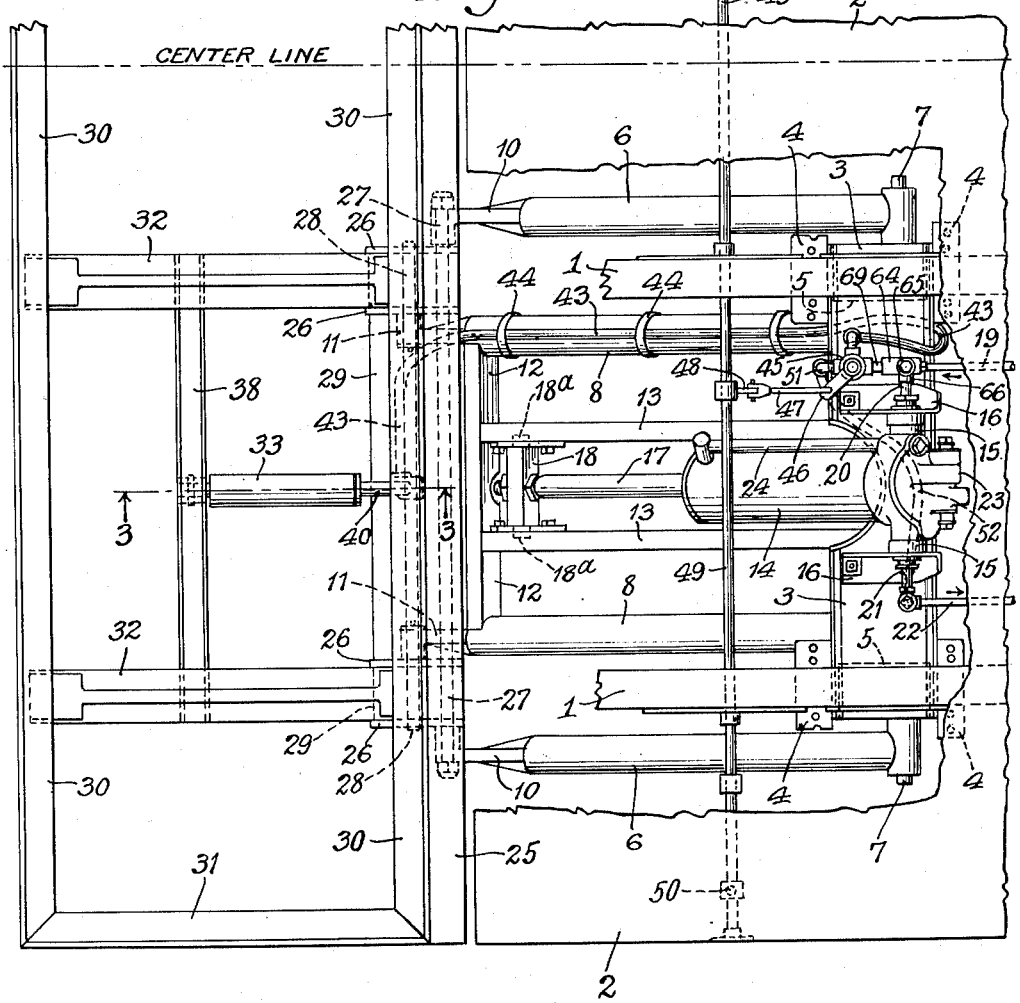
Figure 1 is a plan view of the gate closing means applied to a lifting assembly with parts broken away and parts omitted.

In the form here shown, the device is illustrated as being mounted upon a vehicle such as an automotive truck. Only so much of the truck is illustrated as to indicate the location of the device upon the truck. The truck may include chassis frame members 1 upon which is supported a body platform 2. The details of the framing and particular supporting means for the body and the platform are not illustrated as they form no essential part of the invention.

Generally, it may be understood that the invention comprises an elevating assembly suitable for mounting upon an automotive vehicle and comprising a load carrying surface member and means for lowering it to the load surface and for raising it to bring it substantially level with the upper surface of the body floor. A device of this general type is illustrated in Patent No. 2,389,221, issued November 20, 1945, to Lester W. Wachter, one of the inventors of the device disclosed herewith.

The present invention comprises primarily means for closing and opening the load carrying member so that it may be used as the rear or tail gate of the vehicle upon which the elevating assembly is mounted. Only so much of the main elevating assembly will be described as is necessary to an understanding of the gate closing claimed herewith. The device is supported upon a transverse member 3 which carries attaching plates 4—4. These plates may, as shown, be provided with a plurality of perforations so that bolts or other attaching members may be used to secure them to the frames of vehicles of varying sizes.

Depending from the transverse member 3 are two arm supporting means 5—5. To each of these means is pivoted two pairs of arm members. As shown in Figures 1 and 2, there is an outer pair of arm members 6—6, each of which is pivoted to one of the members 5 as at 7. There is also provided an inner pair of arms 8—8, each of which is pivoted preferably on the inner face of one of the members 5 as at 9, as shown in Figure 2. The arms 6 are each provided with offset portions 10 which are attached to the load carrying member in a manner described below, and each of the arms 8 is provided with a member 11 which is joined to the load carrying member. The arm members 8 may be connected adjacent their free ends by a transverse member 12, as shown in Figure 1, and a pair of longitudinal members 13 may also be fixed between the arms 8. These members are joined to the member 12 at one end and at the other end may be supported concentrically with the pivot 9 of the members 8.

A cylinder 14 is supported in trunnions 15—15 which are themselves carried upon plates 16 secured to the transverse frame or supporting member 3. A piston, not shown, is mounted for reciprocation in the cylinder 14 and a piston rod 17, which is secured to the piston, extends outwardly beyond the cylinder and is attached to a member 18. The member 18 is mounted for rotation as at 18a with respect to the members 13.

Pressure fluid is supplied to the cylinder 14 through a conduit 19 which is connected to the cylinder by means of a connection 20. The connection 20 is concentric with the trunnion 15. Pressure fluid is discharged from the cylinder 14 through a conduit 21 which is connected to a conduit 22 through which pressure fluid returns to its source or to a sump. Generally, pressure fluid is supplied from a pump which may be located at any suitable point either on the vehicle or on the cylinder or elsewhere. It passes through the conduit 19 and the connection 20 and into a valve housing 23 within which a valve, not shown, is positioned. The details of this valve and the operating means for it are omitted since they form no essential part of the present invention.

As above stated, controlled means are provided for directing fluid to the cylinder and for permitting it to be discharged from the cylinder and to return to the pump or to a sump. Preferably the cylinder is of the single acting type and fluid is discharged through the conduit 24 from the valve housing 23 to a point outwardly beyond the piston. Such pressure fluid draws the piston upwardly in the cylinder toward the pivot point of the cylinder and correspondingly draws the piston rod 17 into the cylinder. This movement raises the load carrying member from the full-line position of Figure 1 to the dotted line position of that figure.

The load carrying member comprises generally a framework pivotally supported upon the members 10 and 11 which are themselves secured, respectively, to the arms 6 and 8. A frame member 25 is provided with pairs of hinged parts 26—26. The load carrying platform itself is hinged to these members by means of the shaft 27 which is also engaged by the arms 6. A second shaft 28 is also secured to the members 26. The members 11 of the arms 8 are pivoted upon the shaft 28. A transverse member 29, as shown particularly in Figure 3, extends between the pairs of members 26. The load carrying member proper comprises a framework of any suitable form, as shown. It includes longitudinal frame members 30, end frame members 31 and intermediate frame members 32. The frame members 32 are pivoted upon the shaft 27 or coaxially with it, and the member 25 is secured to one of the frame members 30 and overlies the shaft 27. Surface members, such as boards or plates, may be applied to the framework and overlie the members 32 and support a load. These members have been omitted from the showing in order to make possible the showing of details which appear below the surface.

The construction just described above provides means for raising and lowering the load carrying member, and since the load carrying frame and surface parts are pivoted about the shaft 27, the device may be tilted from the full-line position of Figure 3 to the dotted line position of that figure. When thus tilted it acts as a closing or tail gate for the vehicle body upon which the device, as a whole, is mounted.

Since the gate may be heavy, it is convenient to provide power means for moving it to the closed position and power means for controlling its return to the load carrying or load supporting position. The gate closing means comprises in the forms here shown a cylinder 33 within which is positioned a piston 34 and a spring 34a. A piston rod 35 secured to the piston at one end projects outwardly from the cylinder at its other end and is pivoted, as at 36, between bearing supports 37 which are themselves fixed to a frame member 38. This member may be conveniently joined at its ends to the frame members 32, or it may be otherwise supported upon and attached to the load carrying member. One end of the cylinder is closed by a member 39 to which is attached an extension 40 which, as shown generally in Figure 1 and in detail in Figure 3, is pivoted about the shaft 28.

The extension 40 is provided with a fluid conduit 41, as shown in Figure 3. This conduit is provided with an entrance opening 42 and a flexible conduit 43 is secured to this opening. The conduit, as shown in Figure 1, is secured to one of the arms 8 by attaching bands 44 and extends to a valve housing 45. The conduit 43 is preferably of a flexible material and is capable of withstanding substantial pressures.

The housing 45, to which the conduit is attached, contains a valve which is not shown. It may be a valve of almost any type and is arranged to be positioned to direct pressure fluid into the conduit 43 or to permit the escape of pressure fluid from the conduit. A third position of adjustment is preferably provided by means of which fluid under pressure may be retained in the cylinder 33 to hold the gate closed. A handle 46 is attached to the valve within the housing 45 and by means of an adjustable link 47 is connected to a lever 48 fixed on the shaft 49. This shaft is carried in suitable bearings supported on the truck body or truck frame that is provided with an adjusting handle 50 by means of which it may be moved to move the valve handle 46 and hence the valve.

A return connection 51 is attached to the valve housing 45 and when the valve is suitably adjusted pressure fluid is permitted to pass outwardly from the valve housing through the connection 51 and through the conduit 52 to the return fluid line 22.

In the modified form of Figure 6, the parts are the same as those described above except that certain changes have been made to provide a conduit for pressure fluid to and from the cylinder 33. Instead of the flexible conduit 43 there is provided a path formed by rigid members. Thus, a connection is established from the valve housing 45 to the interior of one of the arms 8. Instead of the solid member 11 shown in the earlier figures, this arm has attached to it a member 53 which is provided with a conduit or passage 54 in communication with the interior of the arm 8. At its outer end the member 53 is provided with a bearing portion 55 which is internally grooved at 56. The passage 54 is in register with the groove 56. Instead of the solid shaft 28 of Figure 1 for example, a hollow or tubular shaft 57 is mounted in the hinged portions 26.

Instead of the member 40, as shown in Figure 3, the cylinder 33, in the form of Figure 6, is provided with an extension 58 which has formed within it a passage 59 and a groove 60. The groove is formed in the enlargement 61 which is positioned about the tube 57. The tube 57 is provided with a plurality of perforations or openings 63 in line with the groove 60 and in communication, therefore, with the passage 59. The tube 57 is also provided with perforations or openings 63 in line with the groove 60 and the passage 59. The modification shown in Figure 6, therefore, provides a passage for pressure fluid to and from the cylinder 33. Substantially all of this passage is formed within supporting members which are a normal part of the load raising assembly. These members are merely modified to provide a fluid passage.

The parts shown in detail in Figures 4 and 5 are positioned in the pressure side of the fluid line and they comprise a housing 64 which, as shown in Figure 4, is connected to the inlet pressure line 19. The member 64 is provided with an upward extension 65 from which a lateral outlet 66 leads toward the cylinder 14 and receives the connecting member 20 which passes through the trunnion 15 and communicates with the valve housing 23. The member 64 is shaped to provide a valve seat 66 against which a ball check valve 67 is normally held by a spring 68. The spring itself is adjustably compressed by a conduit or connection member 69 which communicates with the housing 45 of the three-way valve assembly above described.

Within the extension 65 is formed a valve seat 70 upon which a ball check valve 71 may be seated. A piston 72 is positioned within the extension 65 and may be provided with a member 73 which is provided in its free end with a rounded socket to receive the ball 70. A compression spring 74 is positioned above the piston 72 and is held in adjusted compression by a compression plug 75 which is threaded in the interior of the upper end of the member 65. A sealing plug 76 closes the upper end of the member 65 and may be provided with a gasket 77 or other sealing means.

The use and operation of this invention are as follows:

The invention in the form shown is normally intended to be mounted at some point, usually the rear, upon a motor vehicle such as a truck, and the size and adjustment of the parts is such that the load carrying platform may be lowered to rest upon the ground surface upon which the truck is supported. In its upper position the platform is approximately on a level with the load carrying floor of the truck body. Therefore, in the dotted line position of Figure 2, material may be readily moved from the platform onto the body floor while the two are at substantially the same level. Thereafter, the platform may be raised to act as a closure or tail gate for the vehicle body.

Ordinarily, latch means are provided for holding the platform in the raised position as shown in Figure 2. Since the latch means form no essential part of the present invention, these have been omitted. The platform may be held in the raised position by fluid pressure or by a latch.

Assuming now that the platform has been raised to the position shown in Figures 2 and 3 in which its upper surface is substantially on the same level as the upper surface of the body floor 1, the platform is closed or moved to the vertical position shown by dotted lines in Figure 3 by directing pressure fluid through the valve housing 45 to the cylinder 33. In the form of Figures 1, 2 and 3, pressure fluid passes through the flexible conduit 43 to the cylinder 33. In the form of Figure 6, pressure fluid passes through the conduit formed by the rigid members 8, 53, 57, and 58. The operation of the piston and cylinder assembly which closes the gate is the same for both forms of the invention.

With the parts in the full line position of Figure 3, the pressure fluid is directed in the direction of the arrows shown in the passage 41. The piston 34 is forced outwardly and as it moves outwardly with respect to the cylinder 33, the platform is tilted upwardly about the pivot 27 and raised to the dotted line position of Figure 3. The member 25 acts as a stop and contacts the flat surfaces of the members 26 as shown in Figure 3, and limits the upward movement of the platform from the horizontal to the vertical position. If desired, conventional pressure relief means may be provided in the fluid line to act as a safety check means for preventing breakage of parts when the platform has been raised to the full vertical or body closing position.

When it is desired to permit the platform to move to the horizontal position, the valve is reversed and pressure fluid is expelled from the cylinder 33. The compression spring 34a which has been compressed during the movement of the piston 34 outwardly with respect to the cylinder, will expand and initiate or assist in initiating the return of the piston into the cylinder. The main function of the compression spring 34a is to assist in starting the gate in its movement from the vertical position to the horizontal or load carrying position. Under certain conditions the gate, in a vertical position, is so nearly in balance that the relief of pressure on the cylinder alone might not be sufficient to start the gate to the horizontal position. The compression spring is present, therefore, to make sure that the downward tilting of the gate from the vertical position will always occur once the pressure within the cylinder has been relieved. The return movement mentioned carries the platform and the piston and cylinder assembly again to the full-line position of Figure 3.

The detail shown in Figures 4 and 5 insures adequate pressure to operate the platform tilting or gate closing means, irrespective of the position of the platform elevating means. Fluid under high pressure from the pump is discharged through the conduit 19. Pressure on the ball check valve 71 is so adjusted that the ball 71 will not be raised from its seat 70 until the pressure from the pump is more than sufficient to unseat the ball 67 and thus to conduct fluid under pressure to the three-way valve which controls the operation of the platform tilting mechanism. The presence of the ball check valve 71 and the adjustable pressure means for holding it on its seat cooperate together to insure the presence of adequate pressure in the system to operate the platform tilting means, irrespective of the conditions of operation of the platform raising means.

Due to the fact that the gate closing mechanism shown must be applied to gates of different sizes and weights, it is necessary to provide means for supplying the cylinder 33 with fluid at greater pressures in the case of a heavy or larger gate than are necessary in the case of lighter or smaller gates. As a manufacturing convenience and economy, the mechanism for closing the gate is preferably made in a single size. Since the total gate assembly is, however, manufactured for mounting on trucks of different sizes the load carrying platform is normally made in several different sizes and weights. To avoid making the gate tilting cylinder and associated parts in different sizes it is necessary to provide adjustable means for supplying to the cylinder pressure suitable for closing a gate of the size and weight to which the cylinder and piston assembly are connected. The adjusting means for this purpose are illustrated in Figures 4 and 5. It is desirable normally to set the top closing pressure available to close any gate so that it is just adequate to close the gate itself. The pressure available in each cylinder for closing the gate should, therefore, be only enough to close the gate and not enough to close the gate with a load upon it. By adjusting the nut 75 on the compression spring 74, as shown in Figures 4 and 5, only a predetermined pressure can be applied to the gate to close it. Pressure above the predetermined point will unseat the ball 71 and permit the fluid to pass the seat 70 and to move away through the conduit 20. In other words, when pressure above a predetermined maximum occurs, the bypass system opens to prevent that excess pressure from being transmitted to the cylinder 33. The adjustment of the nut 75 is such that pressure is balanced against the particular gate weight of a given installation. It is to permit this adjustment of the assembly to gates of different weights that the adjustment, including the spring 74 and the adjusting nut 75 and the bypass 20, is included in the device. The pressure is adjusted to be just sufficient to close the gate. In other words, if any load remains upon the gate when the operator attempts to close it, the gate will not close and tip off the object which may have remained upon it. The presence of the object upon the gate naturally increases the weight which must be raised when the gate is moved toward the vertical or closing position and a greater pressure is required to accomplish this movement than is required to close the gate without any load upon it. Before this excessive pressure can reach the cylinder 33 of the gate tipping mechanism, the valve 71 will have been unseated by the excessive pressure and the pressure is reduced so that the gate will not have been moved toward the closing position until the object on the gate is removed. This adjustment, among other advantages, prevents accidental closing of the gate which may have a breakable or valuable piece of cargo upon it, and thus it prevents this possible damage to the cargo.

We claim:

1. In combination, a combined load carrying and gate member, a support for said gate member, and power means for raising said gate member and said support, a pivotal connection between said gate member and said support, and power means for tilting said gate, said means including a cylinder and piston assembly, one member of said assembly being pivotally supported on said gate support, the other of said members being pivotally connected to said gate, compression means within said cylinder biased to resist outward movement of said piston, and means for supplying fluid under pressure to said cylinder to move said piston in opposition to said compression means, the outward movements of said piston being effective to tilt said cylinder and said gate upwardly about their respective pivots.

2. In combination, a combined load carrying and gate member, a support for said gate member, and power means for raising said gate member and said support, a pivotal connection between said gate member and said support, and power means for tilting said gate, said means including a cylinder and piston assembly, one member of said assembly being pivotally supported on said gate support at a point away from the pivot of said gate, the other of said members being pivotally connected to said gate, compression means within said cylinder biased to resist outward movement of said piston, and means for supplying fluid under pressure to said cylinder to move said piston in opposition to said compression means, the outward movement of said piston being effective to tilt said cylinder and said gate upwardly about their respective pivots.

3. In combination, a combined load carrying and gate member, a support for said gate member, and power means for raising said gate member and said support, a pivotal connection between said gate member and said support, and power means for tilting said gate with respect to said support, said means including a cylinder and piston assembly, one member of said assembly being pivotally supported on said gate support at a point away from the pivot of said gate, the other of said members being pivotally connected to said gate, compression means within said cylinder biased to resist outward movement of said piston, and means for supplying fluid under pressure to said cylinder to move said piston in opposition to said compression means, the outward movement of said piston being effective to tilt said cylinder and said gate upwardly about their respective pivots.

WILLIAM C. ANTHONY.
LESTER W. WACHTER.

REFERENCES CITED

The following references are of record in the file of this patent:

UNITED STATES PATENTS

| Number | Name | Date |
|---|---|---|
| 1,346,160 | Barlow | July 13, 1920 |
| 1,452,449 | Thouviot | Apr. 17, 1923 |
| 2,088,260 | Cochran | July 27, 1937 |
| 2,194,594 | Halley | Mar. 26, 1940 |
| 2,239,298 | Kraut | Apr. 22, 1941 |
| 2,260,099 | Chenoweth | Oct. 21, 1941 |
| 2,261,099 | Fairbanks | Oct. 28, 1941 |
| 2,284,661 | Joy | June 2, 1942 |
| 2,456,805 | Wohlforth | Dec. 21, 1948 |
| 2,469,321 | Wood | May 3, 1949 |
| 2,480,528 | Wachter | Aug. 30, 1949 |
| 2,525,424 | Novotney | Oct. 10, 1950 |